United States Patent
Voorhees et al.

(10) Patent No.: US 8,645,590 B2
(45) Date of Patent: Feb. 4, 2014

(54) APPLICATION OF ALTERNATE ALIGN PRIMITIVES DURING SAS RATE MATCHING TO IMPROVE CONTINUOUS ADAPTATION

(75) Inventors: William W. Voorhees, Colorado Springs, CO (US); Patrick R. Bashford, Fort Collins, CO (US); Harvey J. Newman, Milpitas, CA (US)

(73) Assignee: LSI Corporation, Milpitas, CA (US)

( * ) Notice: Subject to any disclaimer, the term of this patent is extended or adjusted under 35 U.S.C. 154(b) by 196 days.

(21) Appl. No.: 13/352,400

(22) Filed: Jan. 18, 2012

(65) Prior Publication Data
US 2013/0185466 A1 Jul. 18, 2013

(51) Int. Cl.
*G06F 3/00* (2006.01)
*G06F 13/00* (2006.01)

(52) U.S. Cl.
USPC .................. 710/29; 710/33; 710/52; 710/60

(58) Field of Classification Search
None
See application file for complete search history.

(56) References Cited

U.S. PATENT DOCUMENTS

| | | | |
|---|---|---|---|
| 7,373,541 B1 * | 5/2008 | Stenfort et al. | 713/503 |
| 7,747,796 B1 * | 6/2010 | Kumar et al. | 710/60 |
| 7,774,424 B1 * | 8/2010 | Bailey et al. | 709/211 |
| 2009/0138786 A1 | 5/2009 | Nishida et al. | |

OTHER PUBLICATIONS

Serial Attached SCSI (SAS) Interface Manual, May 2006, Seagate, All sections and in particular pp. 32, 43-46, 69, 87-88.*

* cited by examiner

*Primary Examiner* — Idriss N Alrobaye
*Assistant Examiner* — David Martinez
(74) *Attorney, Agent, or Firm* — Suiter Swantz pc llo

(57) ABSTRACT

The present invention is directed to a method which allows for substitution of standard SAS ALIGN primitives with an alternative, more spectrally pure set of SAS ALIGN primitives that allows for enhanced continuous adaptation performance. Two consenting SAS devices which are connected to each other may negotiate for and start communicating using the alternate set of ALIGN primitives, which may allow for improved jitter tolerance and reduced bit error rate.

13 Claims, 2 Drawing Sheets

APPLICATION OF ALTERNATE ALIGN PRIMITIVES DURING SAS RATE MATCHING TO IMPROVE CONTINUOUS ADAPTATION

FIELD OF THE INVENTION

The present invention relates to the field of storage semiconductors, storage protocols (such as RAID on chip (ROC), Serial Advanced Technology Attachment (SATA), expanders, Fibre Channel (FC), Peripheral Component Interconnect Express (PCIe)), Serial Attached SCSI (SAS) controllers, and particularly, to application of alternate ALIGN primitives during SAS rate matching to improve continuous adaptation.

BACKGROUND OF THE INVENTION

Currently available methods for providing rate matching may not provide a desired level of performance in SAS environments in which continuous adaptation is performed by communicating SAS devices.

Therefore, it may be desirable to provide a method which addresses the above-referenced shortcomings of currently available solutions.

SUMMARY OF THE INVENTION

Accordingly, an embodiment of the present disclosure is directed to a method for providing rate matching using a first SAS device, the method including: transmitting communications to and receiving communications from a second SAS device for negotiating use of a set of SAS ALIGN primitives, the second SAS device being communicatively coupled with the first SAS device, the set of SAS ALIGN primitives including a plurality of SAS ALIGN primitives; inserting the plurality of ALIGN primitives into data-containing bitstreams, the ALIGN primitives promoting lowering of effective data rates of the bitstreams for providing rate matching; and transmitting the bitstreams to the second SAS device.

A further embodiment of the present disclosure is directed to a method for providing rate matching using a first SAS device, including: transmitting communications to and receiving communications from a second SAS device for negotiating use of a set of SAS ALIGN primitives, the second SAS device being communicatively coupled with the first SAS device, the set of SAS ALIGN primitives including a plurality of SAS ALIGN primitives; receiving transmitted bitstreams at a decision feedback equalizer of the first SAS device, the bitstreams having been transmitted from the second SAS device, each of the bitstreams including data and the plurality of ALIGN primitives, the ALIGN primitives promoting lowering of effective data rates of the bitstreams for providing rate matching; directing the received bitstreams through a Finite Impulse Response (FIR) filter of the decision feedback equalizer of the first SAS device to provide a filter output; receiving the filter output at a detector of the decision feedback equalizer of the first SAS device; providing a filter tap adjustment signal from the detector to the filter based upon the received filter output; adjusting FIR coefficients of the FIR filter based upon the filter tap adjustment signal; providing an adjusted filter output based on the received bitstreams and the filter tap adjustment signal, the adjusted filter output including equalized bitstreams; and directing the adjusted filter output through a detector of the decision feedback equalizer of the first SAS device to provide a detected output.

A further embodiment of the present disclosure is directed to a non-transitory, computer-readable medium having computer-executable instructions for performing a method for providing rate matching using a first SAS device, said method including: transmitting communications to and receiving communications from a second SAS device for negotiating use of a set of SAS ALIGN primitives, the second SAS device being communicatively coupled with the first SAS device, the set of SAS ALIGN primitives including a plurality of SAS ALIGN primitives; inserting the plurality of ALIGN primitives into data-containing bitstreams, the ALIGN primitives promoting lowering of effective data rates of the bitstreams for providing rate matching; and transmitting the bitstreams to the second SAS device.

A further embodiment of the present disclosure is directed to a non-transitory, computer-readable medium having computer-executable instructions for performing a method for providing rate matching using a first SAS device, said method including: transmitting communications to and receiving communications from a second SAS device for negotiating use of a set of SAS ALIGN primitives, the second SAS device being communicatively coupled with the first SAS device, the set of SAS ALIGN primitives including a plurality of SAS ALIGN primitives; receiving transmitted bitstreams at a decision feedback equalizer of the first SAS device, the bitstreams having been transmitted from the second SAS device, each of the bitstreams including data and the plurality of ALIGN primitives, the ALIGN primitives promoting lowering of effective data rates of the bitstreams for providing rate matching; directing the received bitstreams through a Finite Impulse Response (FIR) filter of the decision feedback equalizer of the first SAS device to provide a filter output; receiving the filter output at a detector of the decision feedback equalizer of the first SAS device; providing a filter tap adjustment signal from the detector to the filter based upon the received filter output; adjusting FIR coefficients of the FIR filter based upon the filter tap adjustment signal; providing an adjusted filter output based on the received bitstreams and the filter tap adjustment signal, the adjusted filter output including equalized bitstreams; and directing the adjusted filter output through a detector of the decision feedback equalizer of the first SAS device to provide a detector output.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figure(s) in which.

DETAILED DESCRIPTION OF THE INVENTION

Figure 1:
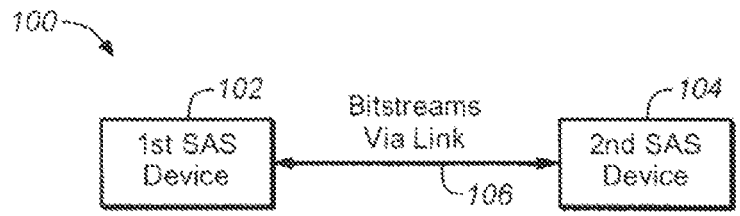
FIG. 1 is a block diagram schematic of a system including multiple, communicatively-coupled SAS devices in accordance with an exemplary embodiment of the present disclosure.

Reference will now be made in detail to the presently preferred embodiments of the invention, examples of which are illustrated in the accompanying drawings.

The Serial Attached Small Computer System Interface (SAS) protocol allows for rate matching to support data transmission rates which are lower than the available physical link rate. Rate matching may be utilized to match the amount of data to be transmitted to the available capacity of the different physical channels. This is accomplished by periodically inserting ALIGN primitives into the transmitted data stream to lower the effective data rate. Repetition of standard SAS ALIGN primitives significantly alters the spectral characteristics of the received data stream, which may have an adverse impact to systems which perform continuous adaptation at their decision feedback equalizer. For example, a continuously adapting decision feedback equalizer of a system may be pulled away from its ideal detection coefficients due to strong spectral components associated with the standard SAS ALIGN primitive set. This may lead to reduced jitter tolerance and potential detection errors for more challenging channels.

The method(s) of the present disclosure may allow for substitution of the standard SAS primitives with a more spectrally pure set that is more conducive to continuous adaptation. For instance, the system(s) and method(s) of the present disclosure may allow for two consenting SAS devices which are connected to each other to negotiate for and start communicating using an alternate set of ALIGN primitives which have more beneficial spectral characteristics. Further, two devices which agree to use the alternate set of ALIGN primitives may then be able to achieve enhanced continuous adaptation performance, including improved jitter tolerance and reduced bit error rate.

The SAS protocol specifies a set of four ALIGN primitives which includes: ALIGN (0), ALIGN (1), ALIGN (2) and ALIGN (3). These four ALIGN primitives may have a fixed encoding, some with very strong harmonic content. In accordance with SAS protocol layer-2 (SPL-2), the physical layers (PHYs) of two consenting SAS devices which are connected to each other rotate through ALIGN (0), ALIGN (1), ALIGN (2) and ALIGN (3) for all ALIGN primitives transmitted after a PHY reset sequence.

Based upon connection rate versus physical link rate, differing levels of rate matching may be applied in SAS environments. With the advent of twelve gigabits-per-second (12 Gbps) SAS, a rate matching ratio of up to an 8:1 rate may be used. This means that 7 of 8 dwords of a transmitted signal may be ALIGN primitives. Further, almost ninety (90) percent of the spectral content in the received signal may be due to ALIGN primitives. In contrast, the data portion of the signal may be scrambled, thus providing a relatively flat spectral characteristic. For protocol robustness, the ALIGN primitives are transmitted in the clear and are not scrambled. However, this may lead to some significant spectral components, some as high as the Nyquist frequency.

When communicating with other devices, an SAS device may receive bitstreams (ex.—digital bitstreams) via a decision feedback equalizer of the SAS device. The decision feedback equalizer may incorporate a mechanism for adjusting front end Finite Impulse Response (FIR) coefficients. If continuous adaptation is employed by the SAS device, the adjustment of the FIR coefficients may occur while live data (ex.—which may potentially be rate matched data) is being received. Thus, a Filter Tap Adjustment state of the SAS device may be unduly swayed by the strong spectral components associated with the ALIGN primitives.

The rapid, alternating one-zero pattern at the Nyquist frequency present in some ALIGN primitives may be subject to higher levels of attenuation since the signal amplitude will be attenuated more than lower frequency patterns due to the insertion loss curve. Adapting to this Nyquist region is not appropriate for lower frequency components present in the scrambled data. This may impair the jitter tolerance of the SAS device.

The present disclosure describes system(s) and method(s) which allow for two consenting SAS devices which are connected to each other to negotiate for and begin communicating using an alternate set of ALIGN primitives which have more beneficial spectral characteristics than currently implemented set(s) of ALIGN primitives. Two devices which agree to use the alternate set of ALIGN primitives may be able to achieve enhanced continuous adaptation performance, including improved jitter tolerance and reduced bit error rate.

Referring to FIG. 1, a system in accordance with an exemplary embodiment of the present disclosure is shown. In an embodiment of the present disclosure, the system 100 may include a first device (ex.—a first SAS device) 102. Further, the system 100 may include a second device (ex.—a second SAS device) 104. Still further, the devices (102, 104) may be communicatively coupled with each other. For example, the devices (102, 104) may be configured for implementing a SAS protocol when communicating with each other.

In exemplary embodiments of the present disclosure, signals (ex.—data streams; bitstreams) may be transmitted between the SAS devices (102, 104). For instance, bitstreams 106 may be transmitted from the first SAS device 102 and received by the second SAS device 104 and vice versa. In further embodiments, the system 100 may be configured for implementing rate matching for supporting data transmission rates which are lower than an available physical link rate of the system 100. For example, the devices (102, 104) may be configured for implementing rate matching by periodically inserting ALIGN primitives (ex.—SAS ALIGN primitives) into the bit streams (ex.—data streams) 106, and then transmitting those data streams to lower the effective data rate.

Figure 3:
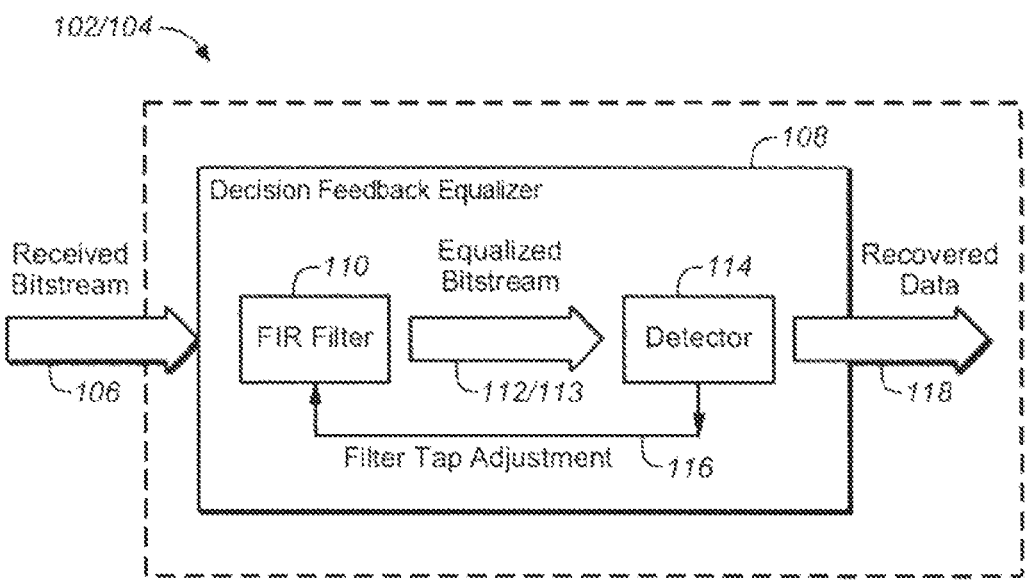
FIG. 3 is a block diagram schematic of a decision feedback equalizer of a SAS device (such as one of the SAS devices of the system shown in FIG. 1), in accordance with exemplary embodiments of the present disclosure.

In embodiments of the present disclosure, each device (102, 104) may include a decision feedback equalizer 108 (as shown in FIG. 3). For instance, the decision feedback equalizer 108 of the second SAS device 104 may be configured for receiving bitstreams 106 transmitted from the first SAS device 102. In further embodiments, the decision feedback equalizer 108 may include (ex.—may incorporate; may implement) a mechanism for adjusting front end Finite Impulse Response (FIR) coefficients. For example, the decision feedback equalizer 108 may implement a FIR filter 110 configured for receiving the bitstreams 106, filtering the bitstreams and outputting the filtered bitstreams 112. Further, a detector 114 may be communicatively coupled with the output of the FIR filter 110 and may be configured for receiving the filtered bitstreams 112 from the FIR filter 110. The detector 114 may be further configured for providing filter tap adjustment signal(s) 116 to the FIR filter 110 for adjusting the output of the FIR filter 110. The filter tap adjustment signal(s) 116 may be provided based upon the filtered bitstreams 112 as part of a feedback loop structure. The FIR filter 110 may then be configured for providing an adjusted bitstream output 113 including equalized bitstreams based upon the received bitstreams 106 and the filter tap adjustment signal(s) 116. The detector 114 may be further configured for providing an output 118 based upon the adjusted bitstream output (ex.—equalized bitstreams) 113.

As mentioned above, the decision feedback equalizer 108 of the SAS device 104 may implement a mechanism for adjusting front end FIR coefficients (ex.—detection coefficients). In further embodiments, the decision feedback equalizer 108 of the SAS device 104 may implement continuous adaptation. In embodiments in which continuous adaptation is implemented, adjustment of the front end FIR coefficients by the SAS device 104 may occur while live data (ex.—rate matched data) included in the bitstreams 106 is being received by the SAS device 104.

In exemplary embodiments of the present disclosure, an alternate (ex.—non-standard) set of SAS ALIGN primitives may be periodically inserted into the data streams 106 by the transmitting device (ex.—the first SAS device 102) and then the data streams 106 may be transmitted to the receiving device (ex.—the second SAS device 104) for implementing rate matching (ex.—to lower the effective data rate). The alternate set of SAS ALIGN primitives may be selected to provide flatter spectral characteristics than currently implemented ALIGN primitives and thus, may allow for better detection of scrambled data by the receiving device (ex.—the second SAS device) 104. In further embodiments of the present disclosure, during initialization of the system 100, both sides of a link (ex.—both the first and second SAS devices (102, 104)) may negotiate the use of the alternate set of SAS ALIGN primitives. For example, standard Speed Negotiation Window (SNW) (ex.—SAS SNW) capabilities bits or Identify Address frame bits may be used by the device(s) (102, 104) during negotiation. Further, when device(s) (ex—side(s) of the link) (102, 104) both send(s) and receive(s) an indication to use the alternate set of ALIGN primitives, then the device(s) (102, 104) may be configured for immediately starting to do so. In still further embodiments, the devices (102, 104) may be configured for utilizing side band techniques for invoking the alternate set of ALIGN primitives.

In embodiments of the present disclosure, the alternate set of SAS ALIGN primitives utilized by the devices (102, 104) may be chosen from amongst unused SAS primitives (ex.—such as described in SAS Protocol Layer (SPL) Annex K). In one embodiment, each of the primitives may have a Hamming distance of at least seven (7); however, a Hamming distance of less than seven (7) may be possible. In further embodiments, the device(s) (102, 104) may be programmable, such that the devices (102, 104) may be programmed to use the alternate set of SAS ALIGN primitives. For example, the device(s) (102, 104) may be configurable (ex.—programmable) to allow for characterization and optimization of a particular set of SAS ALIGN primitives by utilizing the associated receiver to perform the characterization. The device(s) (102, 104) may also be configurable (ex.—programmable) to implement a provision for avoiding new SAS standard primitives as they are defined so that the primitive encoding of a particular set of ALIGNs can be modified, thus providing a method to avoid conflicts with newly defined SAS standard primitives which may use the same encoding.

In exemplary embodiments of the present disclosure, the device(s) (102, 104) may be configured for implementing an ALIGN Continue protocol. The ALIGN Continue protocol may increase the proportion of scrambled data of the bitstream 106, thereby increasing the proportion of scrambled data seen (ex.—detected) by the receiver (ex.—the second device 104). For instance, in the ALIGN Continue protocol, a bitstream transmitted by the transmitting device (ex.—the first device 102) may include the following sequence of dwords: DATA, ALIGNx, ALIGNx, CONT, RSD, RSD, ALIGNx, DATA. In the above sequence, CONT may be a SAS version of the Continue primitive, and RSD may be Random Scrambled Data. The ALIGN Continue protocol may be implemented when the device(s) (102, 104) utilize 8:1 rate matching and may increase the ratio of scrambled data (RSD) which is detected by the receiving device (ex.—the second device 104) up to 50%.

In an embodiment of the present disclosure, the alternate set of ALIGN primitives implemented by the device(s) (102, 104) may promote improved spectral averaging by including a larger number of ALIGN primitives than the number of ALIGN primitives present in the currently implemented standard ALIGN primitive set. For example, the number of different ALIGN primitives implemented in the alternate set may be greater than four and may be based on the number of available unassigned primitives. In further embodiments, the alternate set of ALIGN primitives may include one or more special ALIGN primitives which are used only for rate matching and which have a Hamming distance of less than seven (7).

In exemplary embodiments of the present disclosure, the device(s) (102, 104) may be configured for transmitting/receiving/implementing bitstreams 106 which define a regular pattern of DATA versus RSD and may eliminate the use of ALIGN primitives (ALIGNs) for extended periods of time within a rate matched connection, where the regular pattern is negotiated through some side-band. Exceptions to the regular pattern may be managed with ALIGNs (ex.—true ALIGNs), and once the exception has passed, the regular pattern may be re-established. In further embodiments of the present disclosure, the device(s) (102, 104) may be configured for implementing a set of ALIGN primitives which implements (ex.—rotates through) ALIGN (1), ALIGN (2) and ALIGN (3), but eliminates the use of ALIGN (0). Because the receiving end of the link (ex.—receiving device) may not be checking the rotation sequence of ALIGN primitives, this mode of rotating through ALIGN (1), ALIGN (2) and ALIGN (3), while eliminating the use of ALIGN (0) may be enabled without requiring the devices (102, 104) to negotiate ahead of time.

In embodiments of the present disclosure, the device(s) (102, 104) may be configured for implementing a method which both eliminates the use of the ALIGN (0) primitive and provides an ALIGN primitive set which includes 4 or more different ALIGN primitives which may be selectively implemented for providing a set of ALIGN primitives which is more conducive to continuous adaptation. In further embodiments, the system 100 may implement a mode in which continuous adaptation is turned off (ex.—not running) for any connection (ex.—link) between two devices (102, 104) which is rate matched.

Figure 2:
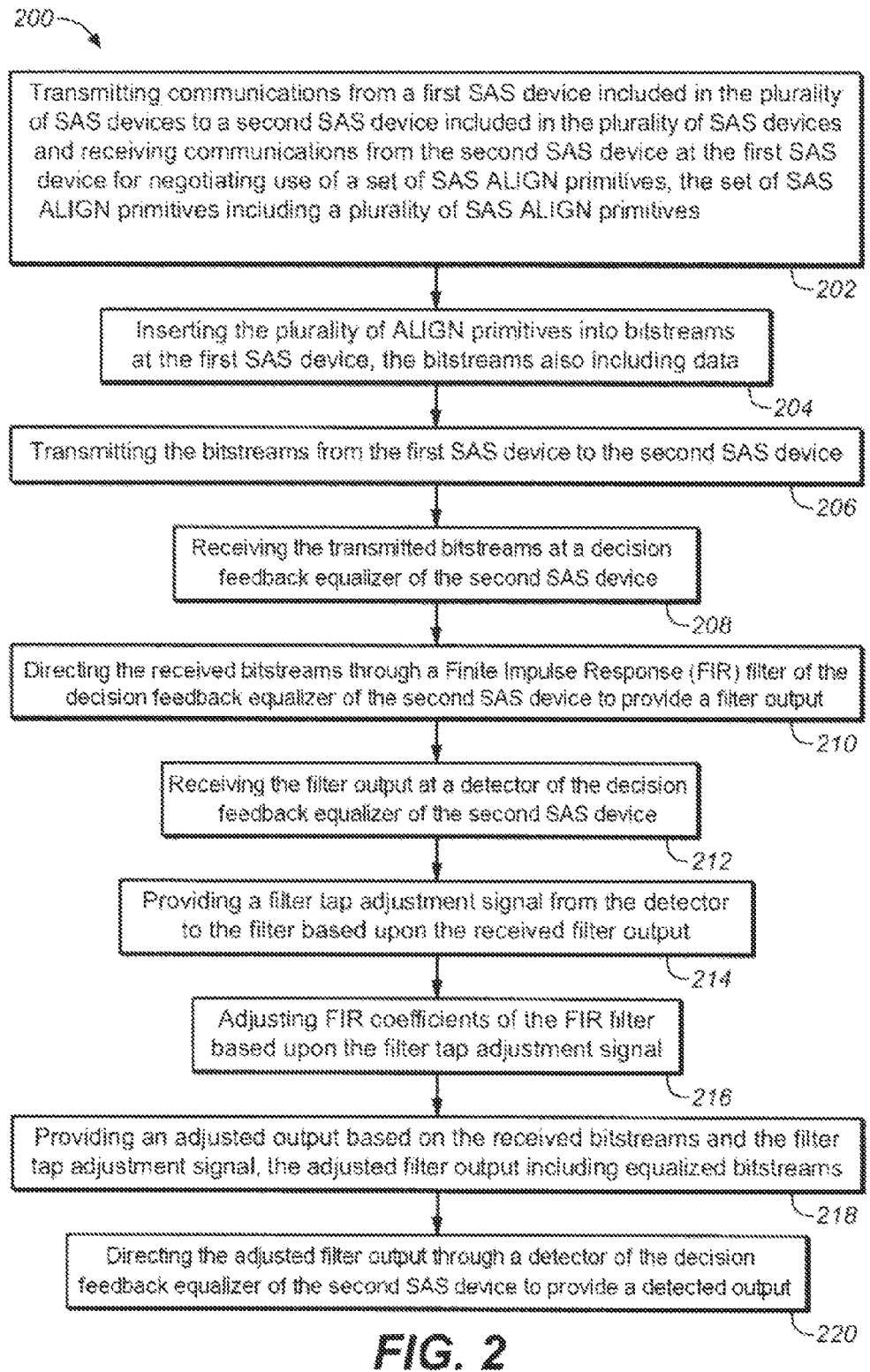
FIG. 2 is a flowchart which illustrates a method for providing rate matching using the SAS devices of the system shown in FIG. 1, in accordance with a further exemplary embodiment of the present disclosure.

FIG. 2 is a flowchart which illustrates a method for providing rate matching in a system including a plurality of SAS devices. In exemplary embodiments of the present disclosure, the method 200 may include the step of transmitting communications from a first SAS device included in the plurality of SAS devices to a second SAS device included in the plurality of SAS devices and receiving communications from the second SAS device at the first SAS device for negotiating use of a set of SAS ALIGN primitives 202, the set of SAS ALIGN primitives including a plurality of SAS ALIGN primitives. In further embodiments, the method 200 may further include the step of inserting the plurality of ALIGN primitives into bitstreams at the first SAS device 204, the bitstreams also including data.

In further embodiments, the method 200 may include the step of transmitting the bitstreams from the first SAS device to the second SAS device 206. In still further embodiments, the method 200 may include the step of receiving the transmitted bitstreams at a decision feedback equalizer of the second SAS device 208. The method 200 may further include the step of directing the received bitstreams through a Finite Impulse Response (FIR) filter of the decision feedback equalizer of the second SAS device to provide a filter output 210. The method 200 may further include the step of receiving the filter output at a detector of the decision feedback equalizer of the second SAS device 212. The method 200 may further include the step of providing a filter tap adjustment signal from the detector to the filter based upon the received filter output 214. The method 200 may further include the step of adjusting FIR coefficients of the FIR filter based upon the filter tap adjustment signal 216. The method may further included the step of providing an adjusted filter output based on the received bitstreams and the filter tap adjustment signal, the adjusted filter output including equalized bitstreams 218. The method 200 may further include the step of directing the adjusted filter output through a detector of the decision feedback equalizer of the second SAS device to provide a detector output 220.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a firmware package and/or a software package. Such a firmware package and/or software package may be a computer program product which employs a computer-readable storage medium including stored computer code which is used to program a computer to perform the disclosed function and process of the present invention. The computer-readable medium/computer-readable storage medium may include, but is not limited to, any type of conventional floppy disk, optical disk, CD-ROM, magnetic disk, hard disk drive, magneto-optical disk, Flash memory, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A non-transitory, computer-readable medium having computer-executable instructions for performing a method for providing rate matching using a first Serial Attached Small Computer System Interface (SAS) device, said method comprising:
    transmitting communications to and receiving communications from a second SAS device for negotiating use of a set of SAS ALIGN primitives, the second SAS device being communicatively coupled with the first SAS device, the set of SAS ALIGN primitives including a plurality of SAS ALIGN primitives;
    receiving transmitted bitstreams at a decision feedback equalizer of the first SAS device, the bitstreams having been transmitted from the second SAS device, each of the bitstreams including data and the plurality of ALIGN primitives, the ALIGN primitives promoting lowering of effective data rates of the bitstreams for providing rate matching; and
    directing the received bitstreams through a Finite Impulse Response (FIR) filter of the decision feedback equalizer of the first SAS device to provide a filter output.

2. A non-transitory, computer readable medium having computer-executable instructions for performing a method as claimed in claim 1, said method further comprising:
    receiving the filter output at a detector of the decision feedback equalizer of the first SAS device.

3. A non-transitory, computer readable medium having computer-executable instructions for performing a method as claimed in claim 2, said method further comprising:
    providing a filter tap adjustment signal from the detector to the filter based upon the received filter output.

4. A non-transitory, computer readable medium having computer-executable instructions for performing a method as claimed in claim 3, said method further comprising:
    adjusting FIR coefficients of the FIR filter based upon the filter tap adjustment signal.

5. A non-transitory, computer readable medium having computer-executable instructions for performing a method as claimed in claim 4, said method further comprising:
    providing an adjusted filter output based on the received bitstreams and the filter tap adjustment signal, the adjusted filter output including equalized bitstreams.

6. A non-transitory, computer readable medium having computer-executable instructions for performing a method as claimed in claim 5, said method further comprising:
    directing the adjusted filter output through a detector of the decision feedback equalizer of the first SAS device to provide a detector output.

7. A method for providing rate matching using a first Serial Attached Small Computer System Interface (SAS) device, comprising:
    transmitting communications to and receiving communications from a second SAS device for negotiating use of a set of SAS ALIGN primitives, the second SAS device being communicatively coupled with the first SAS device, the set of SAS ALIGN primitives including a plurality of SAS ALIGN primitives;
    receiving transmitted bitstreams at a decision feedback equalizer of the first SAS device, the bitstreams having been transmitted from the second SAS device, each of the bitstreams including data and the plurality of ALIGN primitives, the ALIGN primitives promoting lowering of effective data rates of the bitstreams for providing rate matching; and directing the received bitstreams through a Finite Impulse Response (FIR) filter of the decision feedback equalizer of the first SAS device to provide a filter output.

8. A method as claimed in claim 7, further comprising:
receiving the filter output at a detector of the decision feedback equalizer of the first SAS device.

9. A method as claimed in claim 8, further comprising:
providing a filter tap adjustment signal from the detector to the filter based upon the received filter output.

10. A method as claimed in claim 9, further comprising:
adjusting FIR coefficients of the FIR filter based upon the filter tap adjustment signal.

11. A method as claimed in claim 10, further comprising:
providing an adjusted filter output based on the received bitstreams and the filter tap adjustment signal, the adjusted filter output including equalized bitstreams.

12. A method as claimed in claim 11, further comprising:
directing the adjusted filter output through a detector of the decision feedback equalizer of the first SAS device to provide a detector output.

13. A non-transitory, computer-readable medium having computer-executable instructions for performing a method for providing rate matching using a first Serial Attached Small Computer System Interface (SAS) device, said method comprising:
transmitting communications to and receiving communications from a second SAS device for negotiating use of a set of SAS ALIGN primitives, the second SAS device being communicatively coupled with the first SAS device, the set of SAS ALIGN primitives including a plurality of SAS ALIGN primitives;
inserting the plurality of ALIGN primitives into data-containing bitstreams, the ALIGN primitives promoting lowering of effective data rates of the bitstreams for providing rate matching; and
transmitting the bitstreams to the second SAS device; and
directing the received bitstreams through a Finite Impulse Response (FIR) filter of a decision feedback equalizer of the first SAS device to provide a filter output.

\* \* \* \* \*